United States Patent
Kim

(10) Patent No.: US 7,031,000 B1
(45) Date of Patent: Apr. 18, 2006

(54) SYSTEM AND METHOD FOR CONTROLLING A PRINTING DEVICE CAPABLE OF ENABLING SPECIFIC USER TO OCCUPY SPECIFIC CASSETTE OR SPECIFIC SHEET OUTPUT POSITION UNDER CERTAIN CONDITION DURING THE PROCESS OF DRIVING PRINTING DEVICE CONNECTED TO PLURALITY OF USER COMPUTERS THROUGH NETWORK

(75) Inventor: Woon-Il Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 792 days.

(21) Appl. No.: 09/712,950

(22) Filed: Nov. 16, 2000

(30) Foreign Application Priority Data

Nov. 20, 1999 (KR) ............................... 1999-51744

(51) Int. Cl.
*G06K 15/02* (2006.01)
*G06F 13/00* (2006.01)

(52) U.S. Cl. ...................................... 358/1.1; 358/1.13

(58) Field of Classification Search ................ 358/1.11, 358/1.1, 1.9, 1.15, 1.6, 1.2, 1.12, 1.14, 1.16
See application file for complete search history.

(56) References Cited

U.S. PATENT DOCUMENTS

| | | | |
|---|---|---|---|
| 5,220,674 A | 6/1993 | Morgan et al. | |
| 5,299,296 A | 3/1994 | Padalino et al. | |
| 5,699,493 A | 12/1997 | Davidson, Jr. et al. | |
| 5,727,135 A | 3/1998 | Webb et al. | |
| 5,819,015 A | 10/1998 | Martin et al. | |
| 5,898,592 A * | 4/1999 | Salgado et al. | 700/214 |
| 6,025,925 A | 2/2000 | Davidson, Jr. et al. | |
| 6,026,258 A | 2/2000 | Fresk et al. | |
| 6,160,629 A * | 12/2000 | Tang et al. | 358/1.1 |
| 6,422,557 B1 * | 7/2002 | Kakigi | 271/294 |
| 6,499,069 B1 * | 12/2002 | Shimura | 710/62 |
| 6,574,003 B1 * | 6/2003 | Kakuno | 358/1.13 |

* cited by examiner

*Primary Examiner*—Douglas Q. Tran
(74) *Attorney, Agent, or Firm*—Robert E. Bushnell, Esq.

(57) ABSTRACT

A system for controlling a printing device, capable of letting a specific user temporarily occupy a specific cassette or a specific sheet output position under certain conditions during the process of driving a printing device connected to a plurality of user computers through a network, thus preventing specific contents from being undesirably printed by another user when the specific user prints the specific contents using printing sheets, and a method therefor are provided, including the steps of initializing a printing device controller and a printing device by applying electric power to a manipulation panel, a printing device controller, and a printing device; setting an exclusive use with respect to the cassette and the sheet outputting position of a printing device under predetermined set conditions, in response to an input from the manipulation panel or the host computer; and printing specific contents in the cassette and the sheet outputting position of the printing device which are set to be exclusively used, according to a print command from the host computer. The time or the number of works are set to be exclusive use conditions. According to the print controlling method, since it is not necessary to perform reprinting due to print errors, it is possible to improve working efficiency and to save printing sheets.

22 Claims, 6 Drawing Sheets

```
MANIPULATION PANEL DISPLAY UNIT
            READY
JOHN SMITH CASSETTE 1 3/5 WORKS IN USE
```

```
MANIPULATION PANEL UNIT
        PRINTING
JOHN SMITH MANUAL SHEET FEEDER 3/5
       MINUTES IN USE
```

FIG.2C

```
MANIPULATION PANEL INPUT UNIT

CASSETTE  [MANUAL SHEET FEEDER]     EXCLUSIVE USE TIME  [3/5 MINUTES]

EXCLUSIVE USE  [V]                  NUMBER OF WORKS     [3/5 WORKS]

USER  [JOHN SMITH]

SHEET OUTPUTTING POSITION  [MULTIPLE STAGE OUTPUTTING UNIT 3]

EXCLUSIVE USE  [V]

USER  [JOHN SMITH]
```

FIG.2D

```
HOST COMPUTER

CASSETTE  [MANUAL SHEET FEEDER]     EXCLUSIVE USE TIME  [3/5 MINUTES]

EXCLUSIVE USE  [V]                  NUMBER OF WORKS     [3/5 WORKS]

SHEET OUTPUTTING POSITION  [MULTIPLE STAGE OUTPUTTING UNIT 3]

EXCLUSIVE USE  [V]
```

SYSTEM AND METHOD FOR CONTROLLING A PRINTING DEVICE CAPABLE OF ENABLING SPECIFIC USER TO OCCUPY SPECIFIC CASSETTE OR SPECIFIC SHEET OUTPUT POSITION UNDER CERTAIN CONDITION DURING THE PROCESS OF DRIVING PRINTING DEVICE CONNECTED TO PLURALITY OF USER COMPUTERS THROUGH NETWORK

CLAIM OF PRIORITY

This application makes reference to, incorporates the same herein, and claims all benefits accruing under 35 U.S.C. §119 from an application entitled System and Method for Controlling a Printer earlier filed in the Korean Industrial Property Office on 20 Nov. 1999, and there duly assigned Serial No. 99-51744 by that Office.

BACKGROUND OF THE INVENTION

1. Field of the Invention

The present invention relates to a method for controlling a printing device, and more particularly, to a system and method for controlling a printing device, capable of enabling a specific user to temporarily occupy a specific cassette or a specific sheet output position under certain conditions during the process of driving a printing device connected to a plurality of user computers through a network, thus preventing specific contents from being undesirably printed by another user when the specific user prints the specific contents using printing sheets.

2. Description of the Related Art

In general, in outputting documents and drawings prepared by a working equipment such as a personal computer (PC) by a printing device, a plurality of PCs are simultaneously connected to a printing device shared by a plurality of PC users through a network. A printing device generally includes a cassette and a sheet outputting unit. However, the number of PCs connected to the printing device is limited. Therefore, when the number of used PCs is large, the number of printing devices which must be connected to the PCs increases accordingly. This is disadvantageous in saving space.

A printing device including various cassettes for various sizes of sheets such as A5, A4, A3, and B5 and a plurality of sheet outputting units is provided in order to let more PCs share a printing device, to thus solve the above problem. When such a printing device is used, it is possible to save space and to let a plurality of PC users select cassettes and sheet outputting units that are required for each of the users, to thus let the plurality of PC users simultaneously output specific contents.

However, in a network where the printing device including a plurality of cassettes and sheet outputting units are used, when a user among the plurality of users connected to the printing device prints specific contents using a cassette and a sheet outputting unit among the plurality of cassettes and sheet outputting units of the printing device, other contents may be undesirably printed by another user.

For example, when there is a command from the user "B" that specific contents should be printed by occupying the cassette "A" and the sheet outputting unit "a" while the user "A" prints other contents by occupying the cassette "A" and the sheet outputting unit "a", the contents desired to be printed by the user "B" may be printed on the printing sheets of the user "A".

Since the contents to be printed should be reprinted, working efficiency is lowered and large amounts of printing sheets are wasted. Therefore, a new system for controlling the printing device is required for solving the above problems.

Exemplar of the art are U.S. Pat. No. 5,299,296 issued to Padalino, et al. for Multi-function Machine with Interleaved Job Execution, U.S. Pat. No. 6,026,258 issued to Fresk et al. for Method for Temporarily Locking out Print Jobs on a Network Copier When Copier User Is Present, U.S. Pat. No. 5,220,674 issued to Morgan, et al. for Local Area Print Server for Requesting and Storing Required Resource Data and Forwarding Printer Status Message to Selected Destination, U.S. Pat. No. 5,699,493 issued to Davidson, Jr., et al. for Method and Apparatus for Providing Job Accounting Information to a Host Computer from a Printer, U.S. Pat. No. 5,819,015 issued to Martin, et al. for Method and Apparatus for Providing Remote Printer Resource Management, U.S. Pat. No. 5,727,135 issued to Webb, et al. for Multiple Printer Status Information Indication, U.S. Pat. No. 6,025,925 issued to Davidson, Jr., et al. for Method and Apparatus for Providing Accounting Information to Host Computer from a Printer. I have found that the art does not show an efficient way to avoid problems with undesirable printing by users on a shared printer.

SUMMARY OF THE INVENTION

It is an object of the present invention to provide a system and method for controlling a printing device, capable of letting a specific user temporarily occupy a specific cassette or a specific sheet output position under certain conditions during the process of driving a printing device connected to a plurality of user computers through a network, thus preventing other contents from being undesirably printed by another user when the specific user prints specific contents using printing sheets.

It is another object to avoid the undesirable printing by users on a shared printer.

It is still another object to have a way to identify a printing status of a shared printing device.

It is yet another object to process print commands and yet have a reliable way to avoid printing on undesirable printable media.

Accordingly, to achieve the above object, there is provided a system for controlling a printing device according to the present invention, including a printing device having a plurality of sheet storage units for storing sheets on which images will be formed and a plurality of sheet outputting units for outputting the sheets on which the images are formed; a manipulation panel having a display unit for displaying the print state and an input unit for inputting print setting conditions; a host computer for inputting the print setting conditions and giving a print command to output the work result of a user to the printing device; and a printing device controller having a host interface unit for interfacing the host computer, a manipulation panel interface unit for interfacing the manipulation panel, and a printing device interface unit for interfacing the printing device, the printing device controller for processing signals received through the interface units.

Further, a method for controlling the printing of the printing device controlling system having a printing device, a manipulating panel, a printing device controller, and a host computer according to the present invention, includes the steps of initializing a printing device controller and a printing device by applying electric power to the manipulation panel, the printing device controller, and the printing device; setting an exclusive use with respect to the cassette and the sheet outputting position of the printing device under predetermined set conditions, in response to an input from the manipulation panel or the host computer; and printing specific contents in the cassette and the sheet outputting position of the printing device that are set to be exclusively used, according to a print command from the host computer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2C shows an example of an input by the manipulation panel of FIG. 1;

FIG. 2D shows an example of an input by the host computer of FIG. 1;

DETAILED DESCRIPTION OF THE PREFERRED EMBODIMENTS

Figures 1, 2A, 2B:
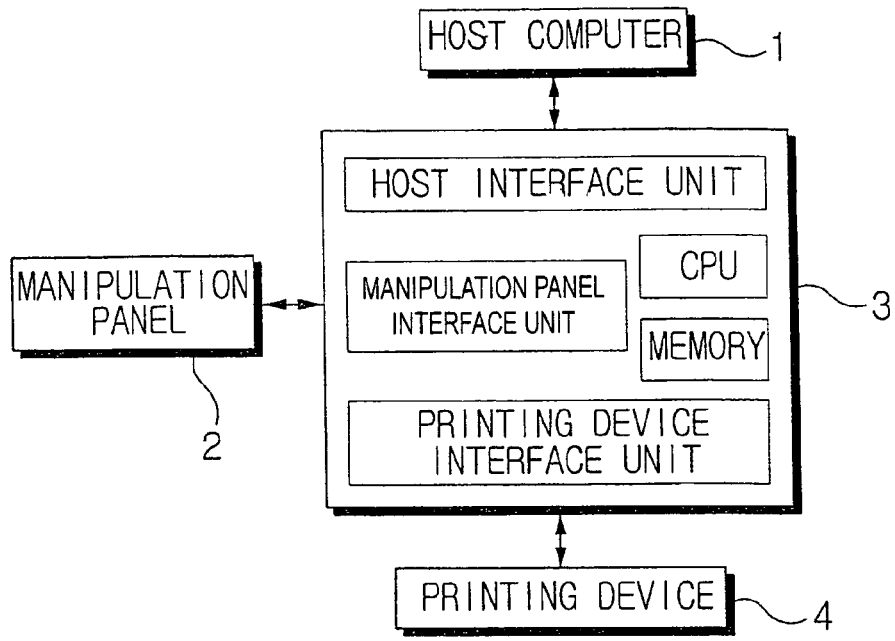
FIG. 1 shows the entire network according to the present invention.
FIG. 2A shows an example of displaying a print ready state by the display unit of the manipulation panel of FIG. 1.
FIG. 2B shows an example of displaying a print processing state of the display unit of the manipulation panel of FIG. 1.

The hardware of the system for controlling a printing device that can be used for the controlling of a printing device according to the present invention includes a host computer 1, a manipulation panel 2, a printing device controller 3, and a printing device 4, as shown in FIG. 1 where the structure of an entire network according to the present invention is shown. The host computer 1 may be a personal computer (PC), however, any device by which a user can prepare documents and drawings and output the preparation results to the printing device may be used as the host computer 1. The manipulation panel 2 includes a display unit for displaying a print state and an input unit for inputting print set conditions.

The printing device controller 3 includes a host interface unit for interfacing the host computer 1, a manipulation panel interface unit for interfacing the manipulation panel 2, a printing device interface unit for interfacing the printing device 4, and a central processing unit (CPU) with possibly a memory for processing various signals received through the interface units. The printing device 4 includes a plurality of sheet storage units such as cassettes and a plurality of sheet outputting means such as sheet outputting units.

In the present invention, not only the manipulation panel 2 but also the host computer 1 can input print setting conditions.

The manipulation panel 2 of FIG. 1 will be described with reference to FIGS. 2A through 2D.

FIGS. 2A and 2B show examples of displaying a print ready state and a print processing state by the display unit of the manipulation panel 2 according to the input by the manipulation panel 2 or the host computer 1, respectively.

The print state such as the print ready state and the print processing state are displayed on the display unit of the manipulation panel 2 by characters as shown in FIGS. 2A and 2B. The name of the exclusive user and the exclusive cassette are also displayed by characters. Accordingly, users can easily know who is exclusively using which cassette.

FIGS. 2C and 2D show an example of an input by the manipulation panel 2 of FIG. 1 and an example of the input of exclusive use setting conditions by the host computer 1, respectively.

Referring to FIGS. 2C and 2D, the input unit of the manipulation panel 2 and the host computer each includes a cassette designating unit, a sheet output position designating unit, an exclusive use display column, an exclusive time designating unit, and a unit for designating the number of works or print jobs. Also, the input unit of the manipulation panel 2 further includes a user display column.

The exclusive user writes the specific cassette and the specific sheet outputting position, that are to be exclusively used in the designating units through input units such as the manipulation panel or a keyboard attached to the host computer. When the exclusive setting condition is time, the user writes the time in the exclusive time designating unit. When the exclusive setting condition is the number of works, the user writes the number of works in the unit for designating the number of works. The user writes predetermined marks showing that the designated specific cassette and specific sheet outputting position are exclusively used in the exclusive use display column. Also, the user writes the name of the exclusive user in the user display column of the input unit of the manipulation panel 2 so that other users can know who the exclusive user is.

When the user gives a print command using the host computer in a state where the exclusive use is set by the input unit of the manipulation panel 2 or the host computer 1, the printing device controller 3 controls the printing device so as to process the print command according to the set conditions.

Hereinafter, the controlling of the printing device will be described in more detail with reference to the attached drawings.

Figure 3:
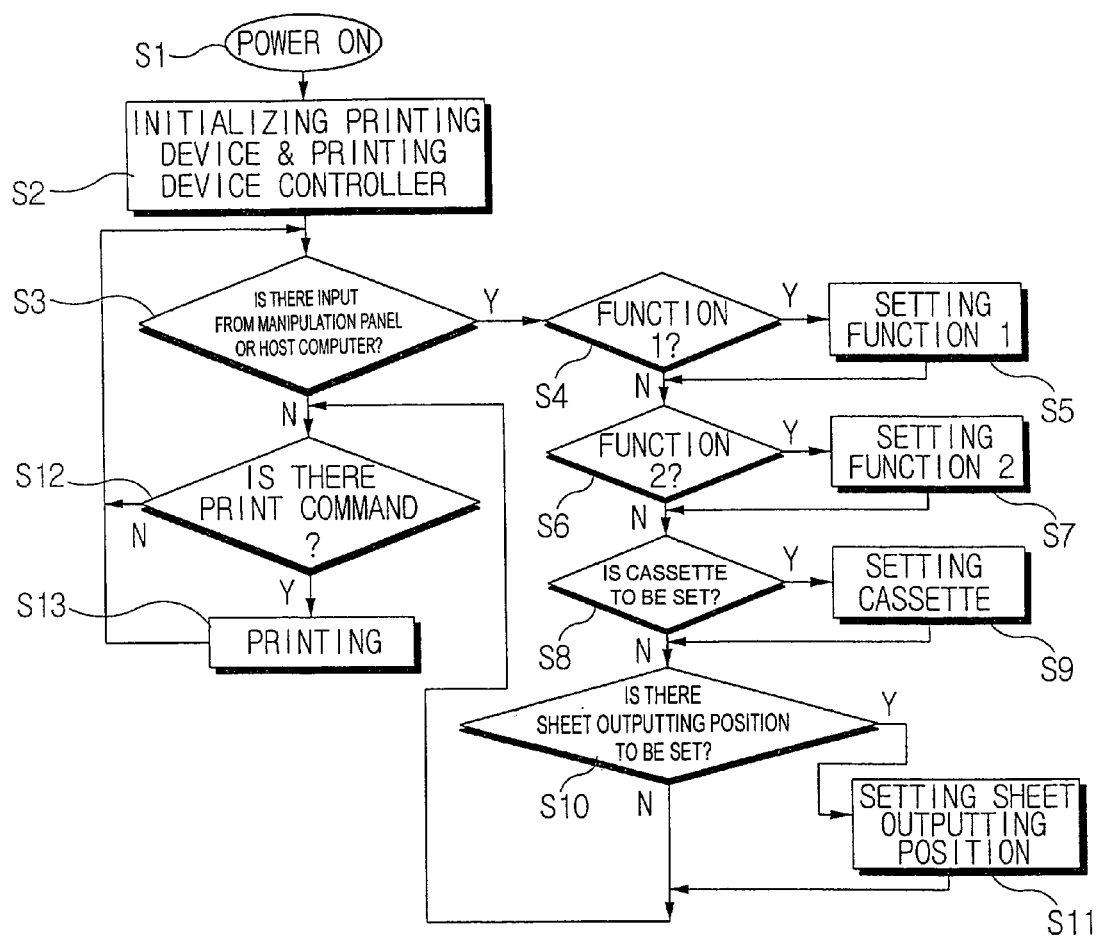
FIG. 3 is a flowchart for showing the controlling of a printing device according to the present invention.

Referring to FIG. 3, in the controlling of the printing device according to the present invention, when the power supply is applied to a printing device system (the printing device controller 3, the manipulation panel 2, and the printing device 4) (step S1), the printing device controller 3 and the printing device 4 are initialized (step S2) and it is determined whether there is an input from the manipulation panel 2 or the host computer 1 (step S3). When it is determined that there is an input, it is determined whether there are functions required by the user (steps S4 and S6). Although it is shown that there are two determinations as to whether there are the functions or not (the steps S4 and S6) in FIG. 3, it should be noted that the number of determinations is not limited thereto, but is corresponding to the total functions required by the user. When it is determined that there are the functions in the steps S4 and S6, the functions are set (steps S5 and S7). When it is determined that there are no functions required by the user or when it is determined that there are the functions required by the user and that the functions are set accordingly, it is determined whether an exclusive use is to be set with respect to the cassette (step S8). When it is determined that the exclusive use is to be set with respect to the cassette, the corresponding cassette is set for exclusive use (step S9). When it is determined that the exclusive use is not set with respect to the cassette or when the corresponding cassette is set to be exclusively used, it is determined whether an exclusive use is to be set with respect to a sheet outputting position (step S10). When it is determined that the exclusive use is to be set with respect to the sheet outputting position, the corresponding sheet outputting position is set for exclusive use (step S11). When it is determined that the exclusive use is not set with respect to the sheet outputting position or when the corresponding sheet outputting position is set to be exclusively used, the process proceeds to a step S12 for determining whether there is a print command. As mentioned above, in the step (S9) of setting the corresponding cassette to be exclusively used and the step (S11) of setting the corresponding sheet outputting position to be exclusively used, the exclusive user who can temporarily occupy a specific cassette or a specific sheet outputting position under certain conditions, is set.

A method for controlling the setting of the exclusive user in the step (S9) of setting the corresponding cassette to be exclusively used will be described in detail with reference to FIG. 4.

When the controlling of the printing device by the manipulation panel 2 or the host computer 1 is set, it is determined whether the print command is received from the host computer (step S12). When it is determined that the print command is not received from the host computer, the step (S3) of determining whether there is an input from the manipulation panel or the host computer through the step (S11) of setting the corresponding sheet outputting position to be exclusively used are repeated. When it is determined that the print command is received from the host computer in the step S12, data (documents and drawings) transmitted from the host computer are printed (step S13).

A method for controlling the setting of the exclusive user in the printing step (S13) will be described later with reference to FIG. 5.

Meanwhile, when a certain period of time elapses after the completion of the printing, the exclusive use setting is automatically canceled, and accordingly, the printing can be performed by the next user.

Now, the method for controlling the setting of the exclusive user in the step (S9) of setting the corresponding cassette to be exclusively used in FIG. 3 will be described. FIG. 4 is a detailed flowchart showing the controlling of the step (S9) of setting the corresponding cassette to be exclusively used. Step S9 is included in the flowchart of FIG. 3 showing the controlling of the printing device.

In the controlling of the step of setting the corresponding cassette to be exclusively used, a cassette is designated (step S9-1) and it is determined whether the designated cassette is set to be exclusively used by another user (step S9-2). When it is determined that the designated cassette is set to be exclusively used by another user, the word "unusable" is displayed on the display unit of the manipulation panel 2 (step S9-3). Instead of displaying "unusable", it is possible to display "next exclusive user designation stand-by" on the display unit of the manipulation panel 2 in order to announce that the next exclusive user is awaiting to print data after the current exclusive user completes printing data. After displaying "unusable" or "next exclusive user designation stand-by" on the display unit of the manipulation panel 2 in the step S9-3, it is determined whether the cassette is re-designated (step S9-4). When it is determined that the cassette is re-designated, the process returns to the step S9-1 and the cassette is reset. When it is determined that the cassette is not re-designated, the process proceeds to a step S9-13 and the setting of the cassette is completed.

When it is determined that the designated cassette is not set to be exclusively used by another user in the step S9-2, it is determined whether an exclusive user is designated (step S9-5). When it is determined that the exclusive user is not designated, the process proceeds to the step S9-13 and the setting of the cassette is completed. When it is determined that the exclusive user is designated, it is determined whether the designated cassette is a basic (or default) cassette (step 9-6). When it is determined that the designated cassette is the basic cassette, the process returns to the step S9-3 and "unusable" is displayed on the display unit of the manipulation panel 2. When it is determined that the designated cassette is not the basic cassette, the exclusive user is designated (step S9-7) and it is determined whether the exclusive use condition is set by the time (step S9-8). When it is determined that the exclusive use condition is set by the time, the setting of the cassette is completed (step S9-13) after inputting the exclusive use time (step S9-9), starting to operate a timer (step S9-10), and displaying the exclusive user (step S9-12). When it is determined that the exclusive use condition is not set by the time, the setting of the cassette is completed (the step S9-13) after inputting the number of exclusive use works (step S9-11) and displaying the exclusive user (step S9-12).

Figure 4:
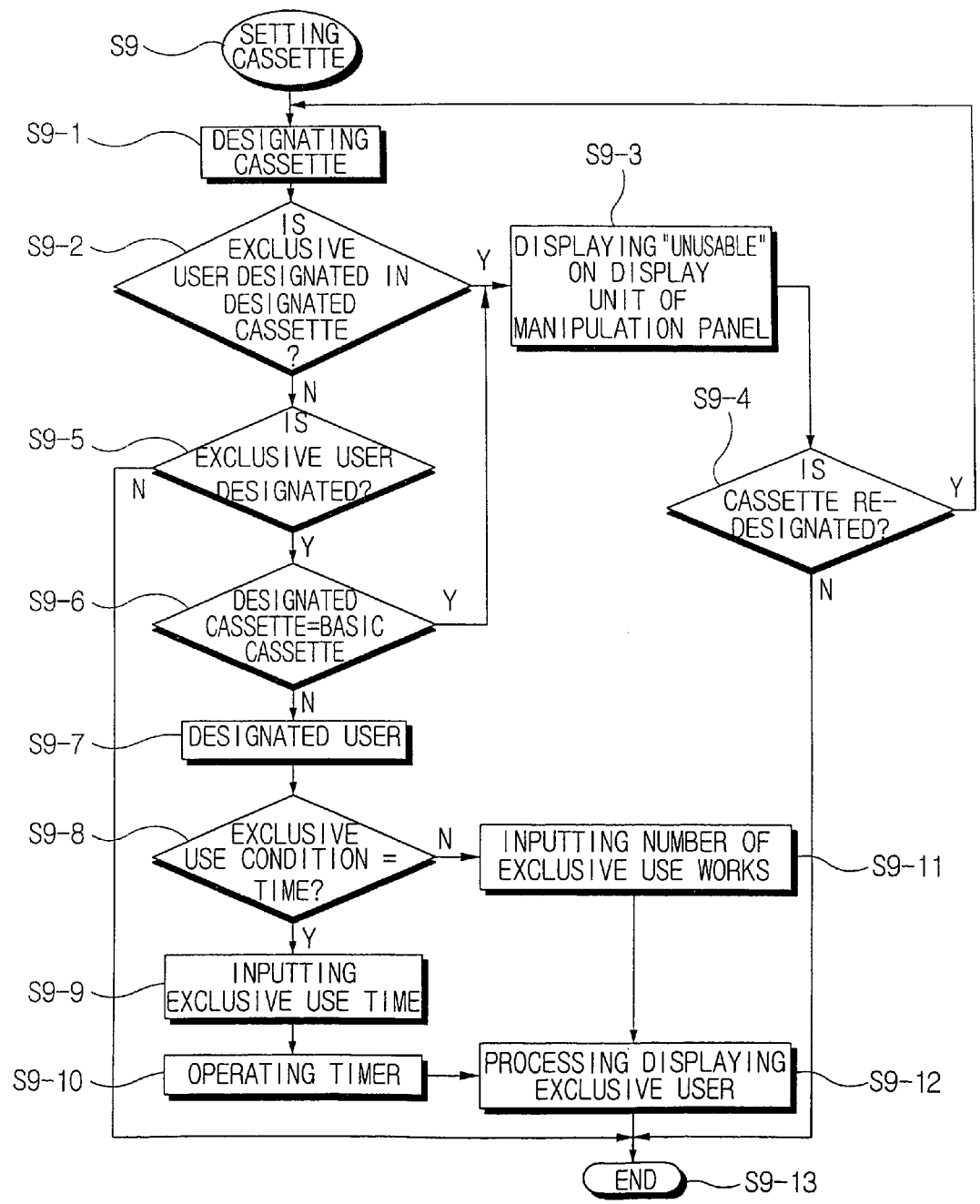
FIG. 4 is a flowchart for showing the controlling of a step for setting a cassette in the flowchart of FIG. 3 in detail.

Since the controlling of the step of setting the corresponding sheet outputting position to be exclusively used in FIG. 3 is performed in the same way as that in FIG. 4, the description thereof will be omitted.

Figure 5:
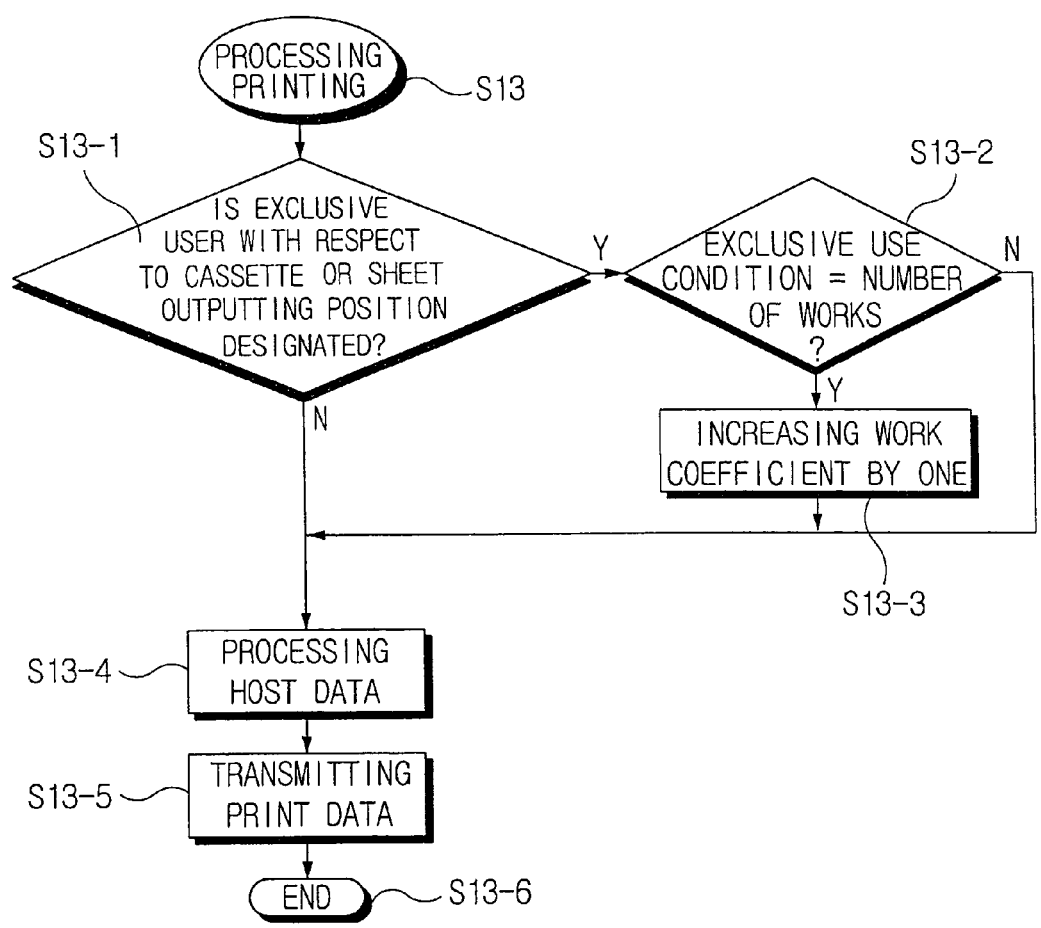
FIG. 5 is a flowchart for showing the controlling of a printing step in the flowchart of FIG. 3 in detail.

Referring to FIG. 5, the method for controlling the setting of the exclusive user in the printing step (S13) of FIG. 3 will be described in detail. In the process of FIG. 3, the print command is received from the host computer and it is determined whether the exclusive user is designated with respect to the cassette or the sheet outputting position (step S13-1). When it is determined that the exclusive user is not designated with respect to the cassette or the sheet outputting position, the printing is completed (step S13-6) after processing the host data (step S13-4) and transmitting print data, which is the processed result, to the printing device (step S13-5). When it is determined that the exclusive user is designated with respect to the cassette or the sheet outputting position in the step S13-1, it is determined whether the exclusive use condition is set by the number of works (step S13-2). When it is determined that the exclusive use condition is set by the number of works, the working coefficient for counting the number of prosecuted works is increased by one (step S13-3) and the process proceeds to the steps S13-4 through S13-6.

Figure 6:
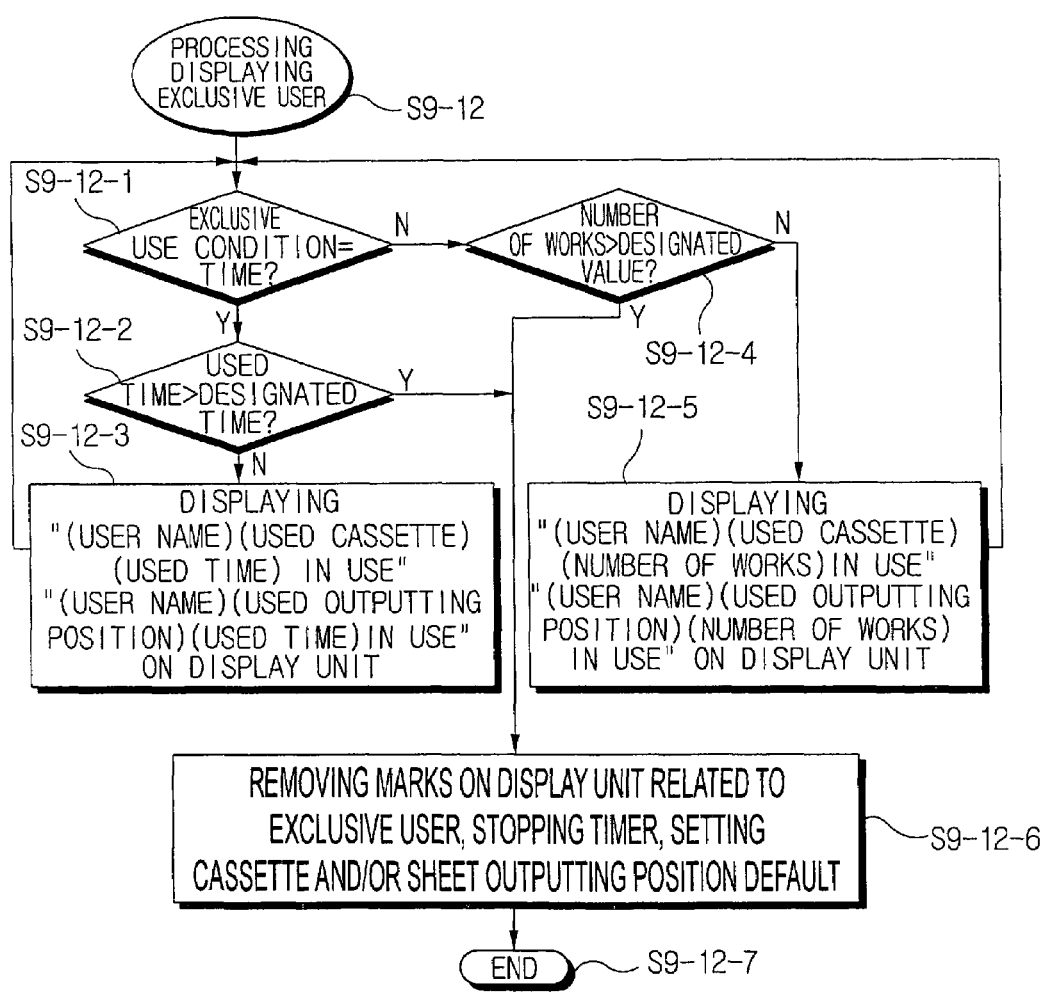
FIG. 6 is a flowchart for showing the controlling of an exclusive user displaying step in the flowchart of FIG. 4 in detail.

Referring to FIG. 6, the method for controlling the setting of the exclusive user in the step of displaying the exclusive user (S9-12) in the flowchart of FIG. 4 will be described in detail. In the displaying of the exclusive user in FIG. 4, it is determined whether the exclusive use condition is set by the time (step S9-12-1). When it is determined that the exclusive use condition is set by the time, it is determined whether the used time exceeds the designated time (step S9-12-2). When it is determined that the used time exceeds the designated time, the displaying of the exclusive user is completed (step S9-12-7) after setting the cassette or the sheet outputting position to be basic, stopping the timer, and removing the marks on the display unit that are related to the exclusive user (step S9-12-6). When it is determined that the used time does not exceed the designated time in the step S9-12-2, the exclusive user and items set with respect to the exclusive user are displayed on the display unit of the manipulation panel (step S9-12-3) and the process returns to the step S9-12-1, thus repeating to display the exclusive user. When it is determined that the exclusive use condition is not set by the time in the step S9-12-1, it is determined whether the number of works exceeds a designated value (step S9-12-4). When it is determined that the number of works exceeds the designated value, the displaying of the exclusive user is completed (step S9-12-7) after setting the cassette and/or the sheet outputting position to be basic, stopping the timer, and removing marks on the display unit which are related to the exclusive user (step S9-12-6). When it is determined that the number of works does not exceed the designated value in the step S9-12-4, the exclusive user and the items set with respect to the exclusive user are displayed on the display unit of the manipulation panel (S9-12-5) and the process returns to the step S9-12-1, thus repeating the displaying process until the displaying of the exclusive user is completed.

According to the method for controlling the printing device according to the present invention, it is possible to let a specific user exclusively use a specific cassette or a specific sheet outputting position under certain conditions during the process of driving the printing device, to thus prevent the contents of another user from being erroneously printed during a printing operation. Therefore, since it is not necessary to perform reprinting due to printing errors, it is possible to improve working efficiency and to save printing sheets.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A system controlling a printing device, comprising:
   said printing device including a plurality of sheet storage unit storing sheets on which images will be formed and a plurality of sheet outputting units outputting the sheets on which the images are formed;
   a manipulation panel including a display unit displaying a print state and an input unit inputting print setting conditions;
   a host computer inputting the print setting conditions and giving a print command to output the work result of a user to said printing device; and
   a printing device controller including a host interface unit interfacing said host computer, a manipulation panel interface unit interfacing said manipulation panel, and a printing device interface unit interfacing said printing device, said printing device controller processing signals received through the interface units,
   with the display unit displaying a print state, a name of an exclusive user, and an exclusive cassette, the exclusive user being the only user performing a print on said printing device, an exclusive cassette being the sheet storage unit used exclusively by the exclusive user.

2. A method for controlling the printing of a printing device controlling system, comprising the steps of:
   initializing a printing device controller of a printing device controlling system and a printing device by applying an electric power to a manipulation panel, the printing device controller, and the printing device, the printing device controlling system including the printing device, a manipulating panel, the printing device controller, and a host computer;
   setting an exclusive use with respect to a cassette and a sheet outputting position of the printing device under a predetermined set condition, in response to an input from the manipulation panel or the host computer; and
   printing specific contents in the cassette and the sheet outputting position of the printing device that are set to be exclusively used, according to a print command from the host computer.

3. The method of claim 2, with said set condition being a time in said step of setting the exclusive use.

4. The method of claim 2, with said set condition being a number of works in the step of setting the exclusive use.

5. The method of claim 2, with said step of setting the exclusive use comprising displaying a symbol signifying the printing device being unusable on the display unit of the manipulation panel when an exclusive user is designated.

6. The method of claim 2, with said step of setting the exclusive use comprising displaying a symbol representing a next user designation stand-by on the display unit of the manipulation panel when the exclusive user is designated.

7. The method of claim 2, further comprising the step of canceling the exclusive use setting when a certain period of time elapses after the completion of a printing operation set by the exclusive user.

8. The method of claim 2, further comprising:
   determining whether an exclusive use is to be set with respect to at least one of said sheet outputting position of the printing device when said cassette is set to be exclusively used; and
   determining whether there is a print command when it is determined that the exclusive use is not set with respect to said sheet outputting position of the printing device or when the corresponding sheet outputting position of the printing device is set to be exclusively used.

9. A method, comprising:
   applying power to a printing device system, said printing device system including a printing device controller, manipulation panel, a printing device, and a host computer, said printing device including a plurality of sheet storage units and a plurality of sheet outputting position units, each one of the sheet storage units storing a same type of printable medium, each one of the sheet outputting position units outputting the printable medium having images generated by said printing device;
   initializing said printing device controller and said printing device;
   determining whether there is an input from said manipulation panel or said host computer;
   determining whether the input is a function required by a user when there is an input from said manipulation panel or said host computer;
   determining whether the function is an exclusive use with respect to the sheet storage unit when the input is determined to be a function required by a user;
   setting the group of printable medium to be used exclusively when the function is determined to be an exclusive use with respect to the sheet storage unit;
   determining whether an exclusive use is to be set with respect to a sheet outputting position unit when it is determined that the exclusive use is not set with respect to the sheet storage unit or when the sheet storage unit is set to be exclusively used;
   setting the corresponding sheet outputting position unit to be exclusively used when it is determined that exclusive use is to be set with respect to the sheet outputting position unit;
   determining whether there is a print command when it is determined that the exclusive use is not set with respect to the sheet outputting position unit or when the corresponding sheet outputting position unit is set to be exclusively used; and printing data transmitted from the host computer when it is determined that the print command is received.

10. The method of claim 9, further comprising a step of setting the function when it is determined the input is a specific function required by the user.

11. The method of claim 10, with said step of setting the sheet storage unit to be used exclusively, further comprising the steps of:
designating at least one of the sheet storage units;
determining whether the designated sheet storage unit is set to be exclusively used by another user;
displaying a symbol showing the designated sheet storage unit being unusable or in a standby mode to any user other than the user exclusively using the sheet storage unit; and
determining whether sheet storage unit is re-designated to another user.

12. The method of claim 11, further comprising the steps of:
resetting the sheet storage unit when it is determined that the sheet storage unit is re-designated; and
setting the sheet storage unit when the sheet storage unit is not re-designated.

13. The method of claim 12, further comprising the steps of:
determining whether an exclusive user is designated when it is determined that the designated sheet storage unit is not set to be exclusively used by another user;
determining whether the designated sheet storage unit is a basic sheet storage unit;
displaying a symbol showing the basic sheet storage unit being unusable;
designating the exclusive user when designated sheet storage unit is not the basic sheet storage unit;
determining whether the exclusive use is conditioned by time; and
setting the sheet storage unit when the exclusive use is conditioned by time.

14. The method of claim 13, further comprising the steps of:
inputting an exclusive use time when the exclusive use condition is determined to be set by time;
starting to operate a timer after inputting the exclusive use time; and
displaying the exclusive user.

15. The method of claim 13, further comprising the steps of:
inputting a number of exclusive use works when the exclusive use condition is not determined to be set by time, the exclusive use works being a group of exclusive print jobs; and
displaying the exclusive user after inputting the number of exclusive use works.

16. The method of claim 14, with said step of displaying the exclusive user further comprising the steps of:
determining whether the exclusive use condition is set by time;
determining whether an exclusive use time exceeds the designated exclusive use time when the exclusive use condition is set by time;
setting the sheet storage unit or the sheet outputting position unit to be basic, stopping the timer, and removing the display related to the exclusive user when exclusive use time exceeds the designated exclusive use time;
displaying the exclusive user and related data when elapsed time does not exceed designated exclusive use time;
updating continually data relating to exclusive user until the exclusive use time exceeds the designated exclusive use time; and
displaying the exclusive user when elapsed time exceeds the designated exclusive use time.

17. The method of claim 16, further comprising:
determining whether the number of works exceeds a designated value when the exclusive use condition is not set by the time;
setting the sheet storage unit, or setting the sheet outputting position unit as default when the number of works exceeds the designated value;
stopping the timer and removing display of the exclusive user when the number of works exceeds the designated value; and
displaying the exclusive user when the number of works does not exceed the designated value and repeating said step of determining whether the exclusive use condition is set by time until the displaying of the exclusive user is completed.

18. The method of claim 17, further comprising the step of cancelling automatically the exclusive use setting when a certain period of time elapses after completion of printing, said step of cancelling allowing a next user to print.

19. The method of claim 17, with said step of printing data further comprising the steps of:
determining whether the exclusive user is not designated with respect to the sheet storage unit or the sheet outputting position unit;
completing the printing when exclusive user is not designated with respect to the sheet storage unit or the sheet outputting position unit;
determining whether the exclusive use condition is set by the number of works when the exclusive user is designated with respect to the sheet storage unit or sheet outputting position unit;
increasing a work coefficient accommodating counting the number of completed works when the exclusive use condition is set by the number of works; and
completing the printing of data on printable medium after the work coefficient is increased.

20. The method of claim 19, with said displaying of data being made on a display unit of said manipulation panel.

21. The method of claim 9, with said step of printing data further comprising the steps of:
determining whether the exclusive user is not designated with respect to the sheet storage unit or the sheet outputting position unit;
completing the printing when exclusive user is not designated with respect to the sheet storage unit or the sheet outputting position unit;
determining whether the exclusive use condition is set by the number of works when the exclusive user is designated with respect to the sheet storage unit or sheet outputting position unit;
increasing a work coefficient accommodating counting the number of completed works when the exclusive use condition is set by the number of works; and
completing the printing of data on printable medium after the work coefficient is increased.

22. A system controlling a printing device, comprising:
said printing device including a plurality of sheet storage unit storing sheets on which images will be formed and a plurality of sheet outputting units outputting the sheets on which the images are formed;
a manipulation panel including a display unit displaying a print state and an input unit inputting print setting conditions;
a host computer inputting the print setting conditions and giving a print command to output the work result of a user to said printing device; and
a printing device controller including a host interface unit interfacing said host computer, a manipulation panel interface unit interfacing said manipulation panel, and a printing device interface unit interfacing said printing device, said printing device controller processing signals received through the interface units,
further comprised of said printing device controller determining whether an exclusive use is to be set with respect to at least one of said sheet outputting position units when said sheet storage unit is set to be exclusively used and determining whether there is a print command when it is determined that the exclusive use is not set with respect to said one of said sheet outputting position units or when the corresponding sheet outputting position unit is set to be exclusively used.

* * * * *